(12) United States Patent
Yoo et al.

(10) Patent No.: US 12,725,783 B2
(45) Date of Patent: Sep. 1, 2026

(54) CATHODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Yeong Bin Yoo, Daejeon (KR); Ji Hoon Choi, Daejeon (KR); Kook Hyun Han, Daejeon (KR); Hee Jun Kweon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 925 days.

(21) Appl. No.: 17/709,886

(22) Filed: Mar. 31, 2022

(65) Prior Publication Data

US 2022/0320575 A1 Oct. 6, 2022

(30) Foreign Application Priority Data

Apr. 1, 2021 (KR) ........................ 10-2021-0042718

(51) Int. Cl.

*H01M 10/0525* (2010.01)
*H01M 4/1391* (2010.01)
*H01M 4/36* (2006.01)
*H01M 4/485* (2010.01)
*H01M 10/054* (2010.01)
*H01M 4/02* (2006.01)

(52) U.S. Cl.

CPC ..... *H01M 10/0525* (2013.01); *H01M 4/1391* (2013.01); *H01M 4/366* (2013.01); *H01M 4/485* (2013.01); *H01M 10/054* (2013.01); *H01M 2004/028* (2013.01); *H01M 2220/20* (2013.01)

(58) Field of Classification Search

None

See application file for complete search history.

(56) References Cited

U.S. PATENT DOCUMENTS

| | | | | |
|---|---|---|---|---|
| 10,056,608 | B2 | 8/2018 | Mun et al. | |
| 10,897,038 | B2 | 1/2021 | Kim | |
| 2014/0377655 | A1 | 12/2014 | Mun et al. | |
| 2018/0191027 | A1 * | 7/2018 | Ohara | H01M 10/0525 |

(Continued)

FOREIGN PATENT DOCUMENTS

| | | | |
|---|---|---|---|
| CN | 105070907 | A | 11/2015 |
| CN | 109796052 | A | 5/2019 |

(Continued)

OTHER PUBLICATIONS

Tang et al., Boosting cell performance of LiNi0.8Co0.1Mn0.1O2 cathode material via structure design, Journal of energy chemistry, 2021, 55, 114-123. (Year: 2021).*

(Continued)

*Primary Examiner* — Zhongqing Wei
(74) *Attorney, Agent, or Firm* — The Webb Law Firm

(57) ABSTRACT

A cathode active material for a lithium secondary battery includes a lithium-transition metal composite oxide particle having a single particle shape, and a first coating layer formed on a surface of the lithium-transition metal composite oxide particle. The first coating layer includes a La—Zr—O compound. Life-span and capacity properties are improved by a combination of the lithium-transition metal composite oxide particle having the single particle shape and the first coating layer formed thereon.

10 Claims, 10 Drawing Sheets

(56) References Cited

U.S. PATENT DOCUMENTS

| | | | | |
|---|---|---|---|---|
| 2018/0261842 | A1 * | 9/2018 | Park | H01M 4/131 |
| 2021/0343996 | A1 * | 11/2021 | Schumacher | H01M 10/052 |
| 2022/0246921 | A1 * | 8/2022 | Kwak | H01M 4/505 |

FOREIGN PATENT DOCUMENTS

| | | | |
|---|---|---|---|
| CN | 111225878 | A | 6/2020 |
| CN | 111279528 | A | 6/2020 |
| CN | 111606362 | A | 9/2020 |
| CN | 111682170 | A | 9/2020 |
| EP | 3687944 | A1 | 8/2020 |
| JP | 5381640 | B2 | 10/2013 |
| JP | 201873563 | A | 5/2018 |
| JP | 20193786 | A | 1/2019 |
| KR | 1020150093542 | A | 8/2015 |
| KR | 1020170093085 | A | 8/2017 |
| WO | 2019063360 | A1 | 4/2019 |
| WO | 2021034020 | A1 | 2/2021 |

OTHER PUBLICATIONS

Bui et al., “Solution Processing of Lithium-Rich Amorphous Li—La—Zr—O Ion Conductor and Its Application for Cycling Durability Improvement of LiCoO2 Cathode as Coating Layer”, Advanced Materials Interfaces, 2021, pp. 1-11., vol. 8, No. 2001767.

Tang et al., “Boosting cell performance of LiNi0.8Co0.1Mn0.1O2 cathode material via structure design”, Journal of Energy Chemistry, 2021, pp. 114-123, vol. 55.

* cited by examiner (a) (b) (c)

(a)

(b)

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0042718 filed Apr. 1, 2021, the disclosure of which is hereby incorporated by reference in its entirety.

BACKGROUND OF THE INVENTION

1. Field of the Invention

The present invention relates to a cathode active material for a lithium secondary battery and a lithium secondary battery including the same. More particularly, the present invention relates to a cathode active material including a lithium-transition metal composite oxide and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile, a hybrid vehicle, etc.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

A lithium metal oxide may be used as a cathode active material of the lithium secondary battery which may preferably provide high capacity, high power and enhanced life-span property. However, when the lithium metal oxide is designed to have a high-power composition, thermal and mechanical stability may be deteriorated to cause deterioration of the life-span property and operational reliability of the lithium secondary battery.

For example, Korean Published Patent Application No. 10-2017-0093085 discloses a cathode active material including a transition metal compound and an ion adsorption binder, which may not provide sufficient life-span and stability.

SUMMARY OF THE INVENTION

According to an aspect of the present invention, there is provided a cathode active material for a lithium secondary battery having improved operational stability and reliability.

According to an aspect of the present invention, there is provided a lithium secondary battery including a cathode active material with improved operational stability and reliability.

A cathode active material for a lithium secondary battery includes a lithium-transition metal composite oxide particle having a single particle shape, and a first coating layer formed on a surface of the lithium-transition metal composite oxide particle. The first coating layer includes a La—Zr—O compound.

In some embodiments, the cathode active material may further include a second coating layer formed on the surface of the first coating layer. The second coating layer may include a Li—B—O compound.

In some embodiments, the La—Zr—O compound may be derived from a first flux agent containing lanthanum and a second flux agent containing zirconium.

In some embodiments, the first flux agent may include $La(OH)_3$, and the second flux agent may include $Zr(OH)_4$.

In some embodiments, a crystallite size of the lithium-transition metal composite oxide particle measured by an XRD analysis may be in a range from 300 nm to 600 nm, and the crystallite size is calculated by Equation 1:

$$L = \frac{0.9\lambda}{\beta\cos\theta} \qquad \text{[Equation 1]}$$

In Equation 1, L is the crystallite size, λ is an X-ray wavelength (nm), β is a full width at half maximum of a (003) plane, and θ is a diffraction angle (rad).

In some embodiments, an average particle diameter (D50) of the lithium-transition metal composite oxide particle may be less than 3.0 μm.

In some embodiments, the La—Zr—O compound may be doped or coated with a doping or coating element, and the doping or coating element may be at least one of Mg, Ca, Al, Ti, W, Ta, P and Nb.

In some embodiments, the single particle shape may include a monolithic shape in which 2 to 10 single particles are attached or adjacent to each other.

In some embodiments, a La (4d) peak may be observed at 102 eV and a Zr (3d) peak may be observed at 128.8 eV when the surface of the lithium-transition metal composite oxide particle is measured by an X-ray photoelectron spectrometer (XPS) analysis.

In some embodiments, wherein the La—Zr—O compound may not include $Li_7La_3Zr_2O_{12}$ having a garnet structure.

In a method of preparing a cathode active material for a lithium secondary battery, a lithium precursor and a transition metal precursor are prepared. The lithium precursor, the transition metal precursor, a first flux agent and a second flux agent are mixed. The mixture including the lithium precursor, the transition metal precursor, the first flux agent and the second flux agent are fired to form a lithium-transition metal composite oxide particle including a first coating layer on a surface thereof. The first coating layer includes a La—Zr—O compound.

In some embodiments, the first flux agent may have an average particle diameter (D50) of 1 μm or less.

In some embodiments, the first flux agent may include $La(OH)_2$, and the second flux agent may include $Zr(OH)_4$. A lanthanum content included in the first flux agent may be from 500 ppm to 2,000 ppm based on a total weight of the lithium-transition metal composite oxide particle.

In some embodiments, a zirconium content in the second flux agent may be from 500 ppm to 2,000 ppm based on the total weight of the lithium-transition metal composite oxide particle.

In some embodiments, boron may be added and a heat treatment may be performed to form a second coating layer including a Li—B—O compound on a surface of the first coating layer.

In some embodiments, a metal hydroxide may be further added in the mixing the lithium precursor, the transition metal precursor, the first flux agent and the second flux agent, and the metal hydroxide may be a hydroxide of at least one of Mg, Ca, Al, Ti, W, Ta and Nb.

In some embodiments, the lithium-transition metal composite oxide particle may be represented by Chemical Formula 1.

$$Li_aNi_xM_{1-x}O_{2+y} \quad \text{[Chemical Formula 1]}$$

In Chemical Formula 1, $0.9 \le a \le 1.5$, $0.6 \le x \le 0.99$, $-0.1 \le y \le 0.1$, and M may be at least one element selected from the group consisting of Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

In some embodiments, a temperature at which the firing is performed may be in a range represented by Equations 2 and 3.

$$t1-15 \le T1(°\,C.) \le t1+15 \quad \text{[Equation 2]}$$

In Equation 2, t1 is a temperature represented by Equation 3 below, and T1 is the temperature at which the firing is performed $$t1(°\,C.)=(-520)*x+1285 \quad \text{[Equation 3]}$$

In Equation 3, x is the same as x in Chemical Formula 1.

A lithium secondary battery includes a cathode including a cathode active material layer that includes the cathode active material for a lithium secondary battery of embodiments as described above, and an anode facing the cathode.

The cathode active material according to embodiments of the present invention may include a lithium-transition metal composite oxide particle having a single particle shape, and a first coating layer formed on a surface of the lithium-transition metal composite oxide particle and including an La—Zr—O compound.

The lithium-transition metal composite oxide particle may have the single particle shape, so that cracks in the lithium-transition metal composite oxide particle may be prevented, and a BET surface area at which the cathode active material reacts with an electrolyte may be decreased. Accordingly, life-span properties such as a capacity retention of the secondary battery may be improved. Additionally, an electrical conductivity at the surface of the lithium-transition metal composite oxide particle may be increased by the first coating layer, enhanced power of the secondary battery may be maintained.

In some embodiments, a second coating layer including a Li—B—O compound may be formed on the surface of the first coating layer. In this case, the power and capacity properties of the secondary battery may be improved according to a further improvement of an ion conductivity.

In a method for preparing a cathode active material according to embodiments of the present invention, a flux agent may be mixed with a lithium precursor and a transition metal precursor, and then annealed. The formation of the flux agent may be facilitated, and the first coating layer may be formed on the surface of the single particle. Accordingly, the above-described effect from the single particle and the first coating layer may be implemented.

DESCRIPTION OF THE INVENTION

According to exemplary embodiments of the present invention, a cathode active material including a lithium-transition metal composite oxide particle and a lithium secondary battery including the same are provided.

Hereinafter, embodiments of the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1A:
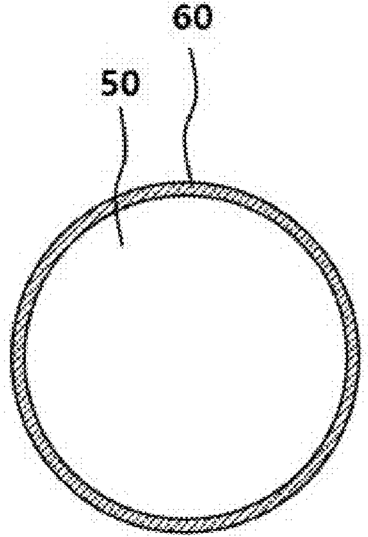
FIGS. 1A and 1B are schematic cross-sectional views illustrating a cathode active materials in accordance with exemplary embodiments.
Figure 1B:
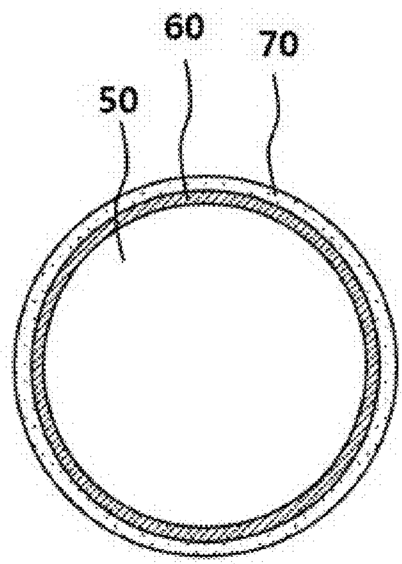

FIGS. 1A and 1B are schematic cross-sectional views illustrating a cathode active materials in accordance with exemplary embodiments. Specifically, FIG. 1A is a cross-sectional view illustrating a cathode active material in which a first coating layer is formed on a surface of a lithium-transition metal composite oxide particle. FIG. 1B is a cross-sectional view illustrating a cathode active material in which a first coating layer is formed on the surface of the lithium-transition metal composite oxide particle and a second coating layer is formed on a surface of the first coating layer.

Referring to FIGS. 1A and 1B, in exemplary embodiments, the cathode active material may include a lithium-transition metal composite oxide particle 50 having a single particle shape and a first coating layer 60 formed on a surface of the lithium-transition metal composite oxide particle 50. The first coating layer 60 may include a La—Zr—O compound.

As used herein, the term "single particle shape" is used to exclude a secondary particle formed by aggregation of a plurality of primary particles. For example, the lithium-transition metal composite oxide particles 50 may substantially consist of particles of the single particle shape, and the secondary particle structure in which primary particles (e.g., the number of the primary particles in the secondary particle is greater than 10, 20 or more, 30 or more, 40 or more, 50 or more, etc.) are assembled or aggregated may be excluded.

The term “single particle shape” is not intended to exclude a monolithic shape in which, e.g., 2 to 10 particles of the single particle shape are attached or adjacent to each other.

In some embodiments, the lithium-transition metal composite oxide particle 50 may include a structure in which a plurality of primary particles are integrally merged together and are substantially converted into the single particle.

For example, the lithium-transition metal composite oxide particle 50 may have a granular or spherical single particle shape.

For example, the lithium-transition metal composite oxide particle 50 may include nickel (Ni), and may further include at least one of cobalt (Co) and manganese (Mn).

For example, the lithium-transition metal composite oxide particle 50 may be represented by Chemical Formula 1 below.

$$Li_aNi_xM_{1-x}O_{2+y} \quad \text{[Chemical Formula 1]}$$

In Chemical Formula 1, $0.9 \le a \le 1.5$, $0.6 \le x \le 0.99$, and $-0.1 \le y \le 0.1$. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

In some preferable embodiments, the molar ratio or concentration of Ni (x) in Chemical Formula 1 may be 0.8 or more, more preferably greater than 0.8. In an embodiment, x may be 0.98 or more.

For example, if a high-Ni composition where x is 0.8 or more is employed, an annealing of the lithium-transition metal composite oxide particle 50 may be performed at a relatively low temperature. Accordingly, in a manufacturing process of the cathode active material for a lithium secondary battery to be described later, the lithium-transition metal composite oxide particle 50 having the single particle shape may be formed at a relatively low temperature.

Ni may serve as a transition metal related to power and capacity of the lithium secondary battery. Accordingly, the high-Ni composition may be employed in the lithium-transition metal composite oxide particle 50 as described above, so that a high-power cathode and a high-power lithium secondary battery may be implemented.

However, as the content of Ni is increased, long-term storage stability and life-span stability of the cathode or the secondary battery may be relatively deteriorated. However, according to exemplary embodiments, life-span stability and capacity retention may be improved by using Mn while maintaining electrical conductivity by including Co.

For example, the lithium-transition metal composite oxide particle may be formed in the form of a secondary particle including primary particles densely agglomerated therein. In this case, micro-cracks may be formed at an inside of the secondary particle during charging and discharging of the battery, and a side reaction between an electrolyte and the cathode active material may be accelerated to generate a gas from an inside of the battery. As a result, the life-span stability of the secondary battery may be deteriorated as charging and discharging are repeated.

According to exemplary embodiments of the present invention, the lithium-transition metal composite oxide particle 50 may have the single particle shape. Thus, cracks of the particles may be reduced, and a BET surface area reacting with the electrolyte may also be reduced. Accordingly, the life-span and capacity retention properties of the secondary battery may be improved during repeated charging and discharging.

For example, firing may be performed at a relatively low temperature to form the high-Ni lithium-transition metal composite oxide particle 50 having the single particle shape. However, in this case, an amount of a residual lithium on the surface of the lithium-transition metal composite oxide particle 50 may increase, and an electrical conductivity at the particle surface may be degraded. Accordingly, power and capacity properties of the secondary battery may be slightly degraded.

According to exemplary embodiments of the present invention, the first coating layer 60 including a lanthanum-zirconium-oxygen (La—Zr—O) compound may be formed on the surface of the lithium-transition metal composite oxide particle 50. Accordingly, the electrical conductivity at the surface of the lithium-transition metal composite oxide particle 50 may be enhanced. Therefore, deterioration of the power and capacity properties may be prevented while forming the high-Ni cathode active material in the single-particle shape.

For example, the La—Zr—O compound may include various types of compounds containing La, Zr and O.

In exemplary embodiments, the La—Zr—O compound may be derived from first and second flux agents as will be described later.

For example, the first coating layer 60 may be formed while the single particles are formed by the flux agents as will be described later. In this case, the La—Zr—O compound derived from the flux agent may further include lithium, but may not include $Li_7La_3ZrO_2O_{12}$ having a garnet structure. Thus, according to exemplary embodiments, the first coating layer 60 may be formed together with the formation of the single particle-shaped lithium-transition metal composite oxide particle 50, and the La—Zr—O compound may not include $Li_7La_3Zr_2O_{12}$ having the garnet structure.

In some embodiments, as illustrated in FIG. 1B, a second coating layer 70 that may include a Li—B—O compound having an ion conductivity may be formed on a surface of the above-described first coating layer 60. In this case, the electrical conductivity may be improved by the first coating layer 60, and an ion conductivity may also be improved by the second coating layer 70. Accordingly, the power and capacity properties of the secondary battery may be further improved.

In some embodiments, the La—Zr—O compound included in the first coating layer 60 may be derived from a first flux agent including lanthanum and a second flux agent including zirconium.

In some embodiments, $La(OH)_3$ may be used as the first flux agent, and $Zr(OH)_4$ may be used as the second flux agent.

For example, the first flux agent and the second flux agent may be added in a fabrication of the lithium-transition metal composite oxide particle 50 to be described later. The first flux agent (e.g., $La(OH)_3$) and the second flux agent (e.g., $Zr(OH)_4$) may react with a lithium precursor (e.g., LiOH) to form the single particle-shaped lithium-transition metal composite oxide particle 50, and the first coating layer 60 may be formed on the surface of the lithium-transition metal composite oxide particle 50. Accordingly, a sufficient electrical conductivity may be obtained while forming the cathode active material having the single-particle structure with the high-Ni composition.

In some embodiments, a crystallite size of the lithium-transition metal composite oxide particle 50 measured by an X-ray diffraction (XRD) analysis may be in a range from 300 nm to 600 nm. Within the range of the crystallite size, the lithium-transition metal composite oxide particle 50 having the single particle shape may be formed while preventing degradation of durability and generation of cracks in the cathode active material due to an excessively small particle size.

In exemplary embodiments, "the crystallite size" is a value measured by the XRD analysis. The crystallite size may be obtained by a calculation using Scherrer equation (as shown in Equation 1 below) that includes a full width at half maximum (FWHM) obtained through the XRD analysis.

$$L = \frac{0.9\lambda}{\beta\cos\theta} \qquad \text{[Equation 1]}$$

In the Equation 1 above, L is the crystallite size (nm), $\lambda$ is an X-ray wavelength (nm), $\beta$ is the FWHM of a corresponding peak (rad), and $\theta$ is a diffraction angle (rad). In exemplary embodiments, the FWHM in the XRD analysis for measuring the crystallite size may be measured from a peak of a (003) plane.

In some embodiments, in the Equation 1 above, $\beta$ may be a FWHM correcting a value derived from a device. In an embodiment, Si may be used as a standard material for reflecting the device-derived value. In this case, a FWHM profile of Si over an entire $2\theta$ range may be fitted, and the device-derived FWHM may be expressed as a function of $2\theta$. Thereafter, a value obtained by subtracting and correcting the FWHM value derived from the device in the corresponding $2\theta$ obtained from the above function may be used as $\beta$.

In some embodiments, an average particle diameter (D50) of the lithium-transition metal composite oxide particles 50 may be less than 3.0 μm. Within this case, the lithium-transition metal composite oxide particles 50 of the single particle shape may be effectively formed by sufficient input of the first and second flux agents.

In some embodiments, the average particle diameter (D50) of the lithium-transition metal composite oxide particles 50 may be in a range from 2.0 μm to 2.9 μm. Within this range, while forming the lithium-transition metal composite oxide particle having the single particle shape, deterioration of life-span properties due to cracks in the cathode active material may be effectively prevented during a pressing process of an electrode.

The terms "average particle size" or "D50" used herein may refer to a particle size when a volumetric cumulative percentage in a particle size distribution obtained from a particle volume corresponds to 50%.

For example, the average particle diameter may be measured through a particle size analyzer (PSA).

Figure 2:
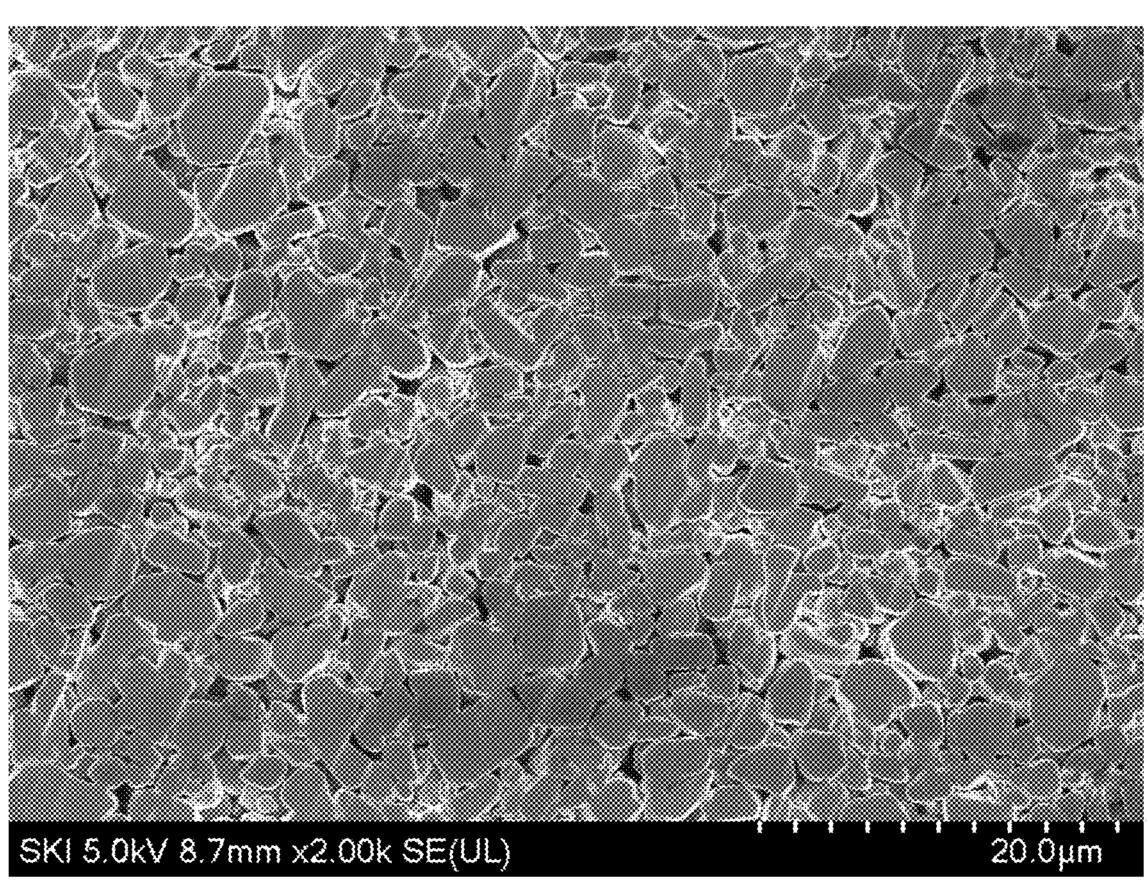
FIG. 2 is an SEM (Scanning Electron Microscopy) image for measuring a particle size of a lithium-transition metal composite oxide particle in accordance with exemplary embodiments.

FIG. 2 is an SEM (Scanning Electron Microscopy) image for measuring a particle size of a lithium-transition metal composite oxide particle in accordance with exemplary embodiments.

Referring to FIG. 2, a cross-sectional image may be obtained by an ion milling of the cathode active material including the lithium-transition metal composite oxide particle 50, and an average size of 50 single particles may be measured to determine the average particle diameter.

In some embodiments, the La—Zr—O compound of the first coating layer 60 may be doped or coated with a doping or coating element. For example, the doping or coating element may be at least one of Mg, Ca, Al, Ti, W, Ta, P and Nb.

The doping or coating element may be doped in the layered structure of the above-described La—Zr—O compound to further enhance the electrical conductivity and improve the power and capacity properties of the cathode active material. Accordingly, even though the cathode active material having the high-Ni composition is fabricated as the single particle shape, improved power property of the secondary battery may be achieved.

Figure 3:
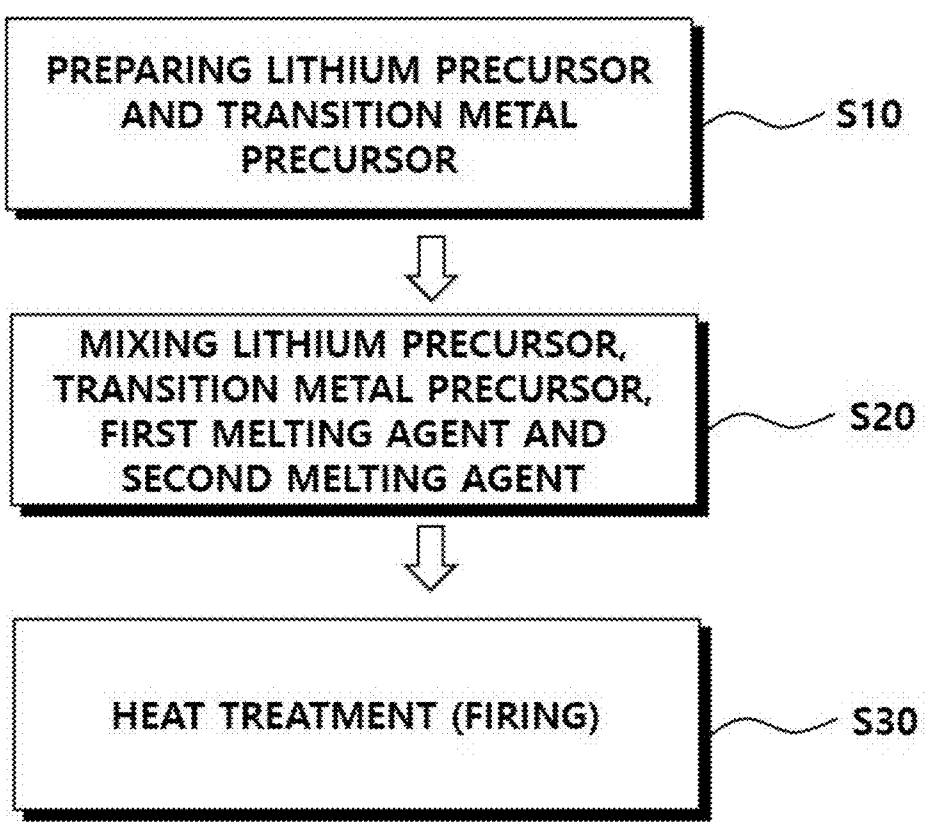
FIG. 3 is a process flow diagram illustrating a method of preparing a cathode active material in accordance with exemplary embodiments.

FIG. 3 is a process flow diagram illustrating a method of preparing a cathode active material in accordance with exemplary embodiments.

Referring to FIG. 3, a lithium precursor and a transition metal precursor may be prepared (e.g., in an operation of S10).

The lithium precursor may include, e.g., lithium carbonate, lithium nitrate, lithium acetate, lithium oxide, lithium hydroxide, or the like. These may be used alone or in a combination of two or more therefrom.

For example, the transition metal precursor may be prepared through a co-precipitation reaction of metal salts. The metal salts may include a nickel salt, a manganese salt and a cobalt salt.

Examples of the nickel salt include nickel sulfate, nickel hydroxide, nickel nitrate, nickel acetate and a hydrate thereof. Examples of the manganese salt include manganese sulfate, manganese acetate and a hydrate thereof. Examples of the cobalt salt include cobalt sulfate, cobalt nitrate, cobalt carbonate and a hydrate thereof.

The metal salts may be mixed with a precipitating agent and/or a chelating agent with a ratio satisfying the content or concentration ratio of each metal described with reference to Chemical Formula 1 to prepare an aqueous solution. A transition metal precursor may be prepared by co-precipitating the aqueous solution in a reactor.

The precipitating agent may include an alkaline compound such as sodium hydroxide (NaOH), sodium carbonate ($Na_2CO_3$), etc. The chelating agent may include, e.g., aqueous ammonia (e.g., $NH_4OH$), ammonium carbonate (e.g., $NH_3HCO_3$), etc.

A temperature of the co-precipitation reaction may be adjusted in, e.g., a range from about 40° C. to 60° C. A reaction time may be adjusted in a range of about 24 hours to 72 hours.

In exemplary embodiments, the prepared lithium precursor, the transition metal precursor, the above-described first flux agent and the second flux agent may be mixed (e.g., in an operation of S20).

For example, the first flux agent may include $La(OH)_3$, and the second flux agent may include $Zr(OH)_4$. The first coating layer 60 including the La—Zr—O compound may be formed on the surface of the lithium-transition metal composite oxide particle 50 in the firing process to be described later by using the first and second flux agents.

In some embodiments, the first flux agent (e.g., $La(OH)_3$) may be pulverized before the addition of the first and second flux agents. In this case, a particle size may be sufficiently reduced to improve reactivity with the lithium precursor and the transition metal precursor. Accordingly, the formation of the lithium-transition metal composite oxide particles 50 of the single particle shape and the first coating layer 60 may be facilitated.

Figure 4:
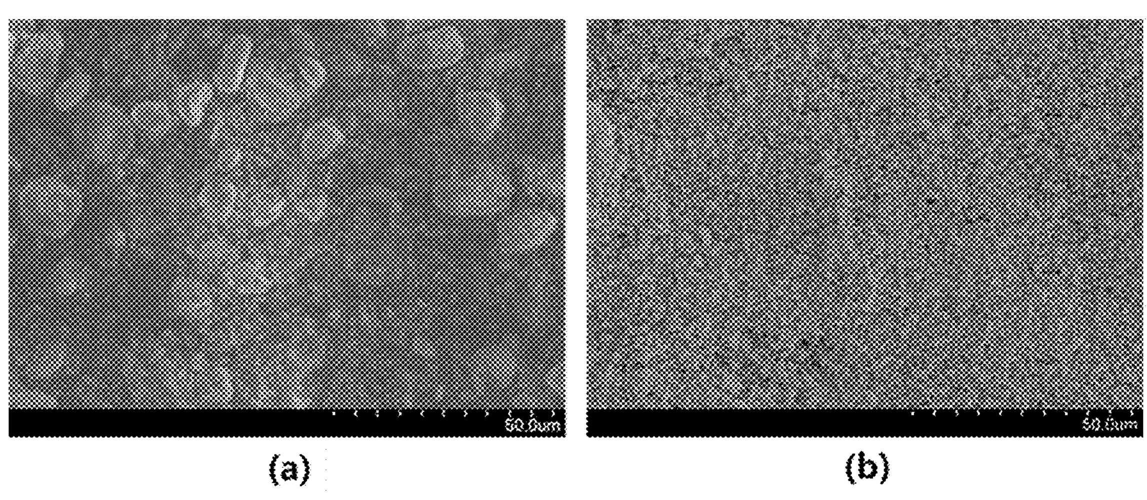
FIG. 4 is an SEM image for describing a pulverization process of a flux agent in accordance with exemplary embodiments.

FIG. 4 is an SEM image for describing a pulverization process of a flux agent in accordance with exemplary embodiments.

Referring to FIG. 4, the first flux agent powder may be pulverized to have an average particle diameter of 1 μm or less (e.g., from a state (a) to a state (b)). In this case, the formation of the lithium-transition metal composite oxide particle 50 having the uniform single particle shape may be facilitated. Accordingly, deterioration of the capacity and life-span properties of the secondary battery due to a formation of non-uniform single particle shape may be prevented.

The pulverization may be performed using, e.g., a jet mill.

In some embodiments, $La(OH)_3$ may be used as the first flux agent, and a lanthanum content included in the first flux agent may be from 500 ppm to 2,000 ppm based on a total weight of the lithium-transition metal composite oxide particle 50. Preferably, the lanthanum content in the first flux agent may be from 500 ppm to 1,000 ppm based on the total weight of the lithium-transition metal composite oxide particle 50.

Within the range of the lanthanum content, the first flux agent may be sufficiently introduced to form the single particle while preventing a formation of non-uniform macro particles. Accordingly, both the power and life-span properties of the secondary battery may be improved.

In some embodiments, $Zr(OH)_4$ may be used as the second flux agent, and a zirconium content included in the second flux agent may be from 300 ppm to 2,000 ppm based on the total weight of the lithium-transition metal composite oxide particle 50. Preferably, the zirconium content included in the second flux agent may be from 500 ppm to 1,000 ppm based on the total weight of the lithium-transition metal composite oxide particle 50.

Within the range of the zirconium content, the second flux agent may be sufficiently introduced together with the first flux agent to form the single particle while forming the first coating layer including the La—Z—O compound.

The lithium precursor, the transition metal precursor, the first flux agent and the second flux agent mixed with each other may be fired to form the lithium-transition metal composite oxide particle 50 having the first coating layer 60 that may be formed on the surface thereof and may include La—Z—O compound (e.g., in an operation of S30).

Figure 5:
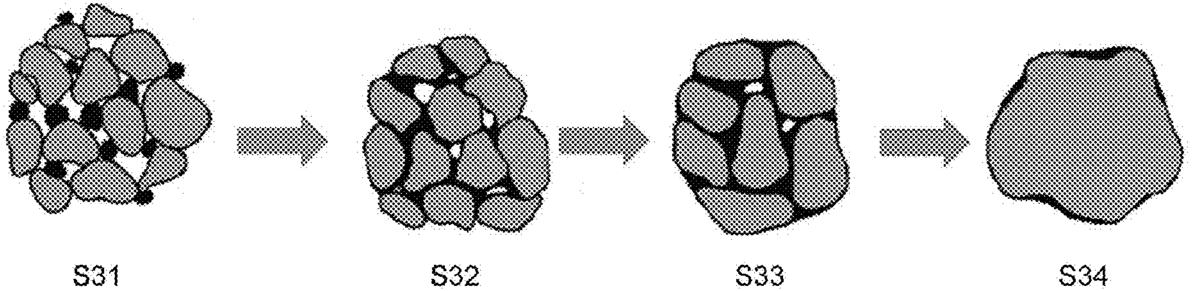
FIG. 5 is a schematic flowchart for describing a formation of a cathode active material in accordance with exemplary embodiments.

FIG. 5 is a schematic flowchart for describing a formation of a cathode active material in accordance with exemplary embodiments.

In FIG. 5, the flux agents are indicated as relatively small dots between masses of the lithium precursor and the transition metal precursor.

Referring to FIG. 5, in, e.g., an operation of step S31, the lithium precursor, the transition metal precursor and the flux agent may be prepared in a mixed powder state through the above-described mixing process (e.g., in the operation of step S20).

For example, when the lithium precursor and the transition metal precursor are mixed and fired without adding the flux agent, each particle may be grown to form a secondary particle instead of the single particle. In this case, gas may be generated due to particle cracks caused by repeated charging and discharging. Accordingly, the capacity retention of the secondary battery may be reduced.

As illustrated in FIG. 5, if the above-described flux agents (the first flux agent and the second flux agent) are added and mixed, the flux agents and the lithium precursor may react to form an intermediate in a liquid state. In this case, as the intermediate reacts with the transition metal precursor, a rearrangement phenomenon may occur to reduce a surface tension (e.g., in an operation of S32).

Figure 6:
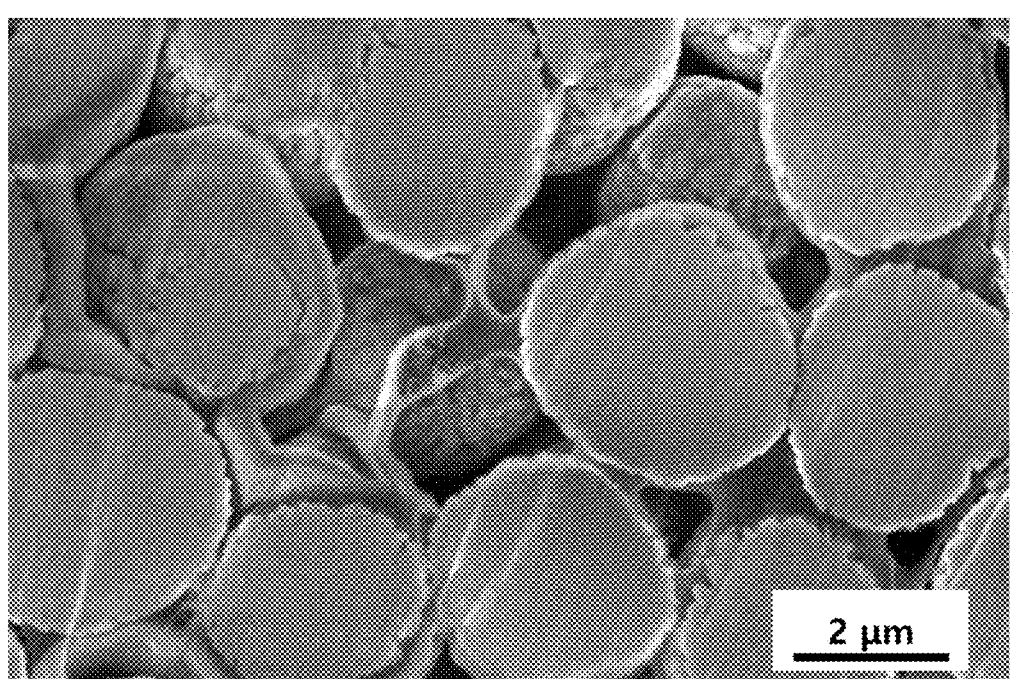
FIG. 6 is an SEM image for describing a solution reprecipitation phenomenon by a flux agent.

FIG. 6 is an SEM image for describing a solution reprecipitation phenomenon by a flux agent. For example, $La(OH)_3$ introduced as the first flux agent may induce a solution re-precipitation after the rearrangement phenomenon.

Referring to FIG. 6, after the rearrangement, a solution re-precipitation phenomenon may occur, so that pores at an inside of the lithium-transition metal composite oxide particle may be reduced (e.g., in an operation of S33).

For example, the re-precipitated lithium-transition metal composite oxide particle may be formed to have the single particle shape through a densification (e.g., in an operation of S34). In this case, particle cracks and gas generation during repeated charging and discharging of the secondary battery may be reduced, so that the life-span properties of the battery may be improved.

In some embodiments, after performing the above-described firing (e.g., in the operation of S30), boron may be added to the first coating layer 60 and a heat treatment may be performed. In this case, the second coating layer 70 including the Li—B—O compound may be formed on the first coating layer 60. Thus, a surface ionic conductivity of the cathode active material may be increased, thereby improving the power properties of the secondary battery. For example, the heat treatment may be performed at a temperature from 200° C. to 400° C.

For example, the first flux agent may contain a metal cation having an ionic radius greater than that of nickel, cobalt and manganese. For example, the ionic radius of $La^{3+}$ contained in $La(OH)_3$ is 103.2 pm, the ionic radius of $Ni^{2+}$ is 83 pm, the ionic radius of $Co^{3+}$ is 68.5 pm, and the ionic radius of $Mn^{4+}$ is 67 pm. La may not be included in a layered structure due to the relatively large ionic radius to form the La—Zr—O compound together with Zr derived from the second flux agent on the surface of the lithium-transition metal composite oxide particle. Accordingly, the above-described improvement of the life-span properties may be implemented.

In some embodiments, a metal hydroxide may be further added while mixing the above-described first and second flux agents. For example, a metal hydroxide may be added together with $La(OH)_3$ and $Zr(OH)_4$ into a mixture of the lithium precursor and the transition metal precursor. In this case, the La—Zr—O compound included in the first coating layer 60 may be doped or coated with a metal contained in the metal hydroxide to further improve the electrical conductivity of the cathode active material.

For example, the metal may be at least one of Mg, Ca, Al, Ti, W, Ta and Nb.

In some embodiments, the temperature of the above-described firing (e.g., in the operation of S30) may satisfy Equations 2 and 3 below.

$$t1-15 \leq T1(°\ C.) \leq t1+15 \quad \text{[Equation 2]}$$

In Equation 2, t1 may be a temperature according to Equation 3 below, and T1 may be a temperature at which the firing is performed.

$$t1(°\ C.)=(-520)*x+1285 \quad \text{[Equation 3]}$$

In Equation 3, x may be the same as x included in the above-described Chemical Formula 1.

Within the above temperature range, the lithium-transition metal composite oxide particles 50 having the single particle shape and having a proper average particle size and a crystallite size may be more effectively formed.

In some embodiments, a metal oxide coating layer may be further formed on the lithium-transition metal composite oxide particle formed according to the operations of S10 to S30 as described above.

For example, the lithium-transition metal composite oxide particles and a metal oxide may be mixed and heat-treated to form the metal oxide coating layer on the lithium-transition metal composite oxide particle. In this case, cracks on the particle surface which may be caused by a collision between particles in the jet mill process may be removed. Accordingly, the life-span properties of the secondary battery may be further improved.

For example, the metal oxide may include an oxide of at least one of Al, Mg, Ca, Al, Ti, W, Ta and Nb. For example, the metal oxide may include $Al_2O_3$.

In some embodiments, the metal oxide coating layer may additionally contain a phosphorus compound. In one embodiment, the phosphorus compound may be $(NH_4)H_2PO_4$.

In some embodiments, the lithium-transition metal composite oxide particle on which the above-described metal oxide coating layer may be washed.

For example, the lithium-transition metal composite oxide particles on which the metal oxide coating layer is formed and water may be mixed with each other in a volume ratio of 1:1, stirred, and dried. Accordingly, a residual lithium remaining on the surface of the lithium-transition metal composite oxide particles may be removed, thereby improving the power and life-span properties of the secondary battery.

In some embodiments, a boron-containing coating layer may be further formed on the washed and dried lithium-transition metal composite oxide particle.

For example, the washed and dried lithium-transition metal composite oxide particles may be mixed with boric acid ($H_3BO_3$), and then heat-treated to further form the boron-containing coating layer on the lithium-transition metal composite oxide particles. Accordingly, the ionic conductivity of the cathode active material may be improved, thereby further improving the power properties of the secondary battery.

Figure 7:
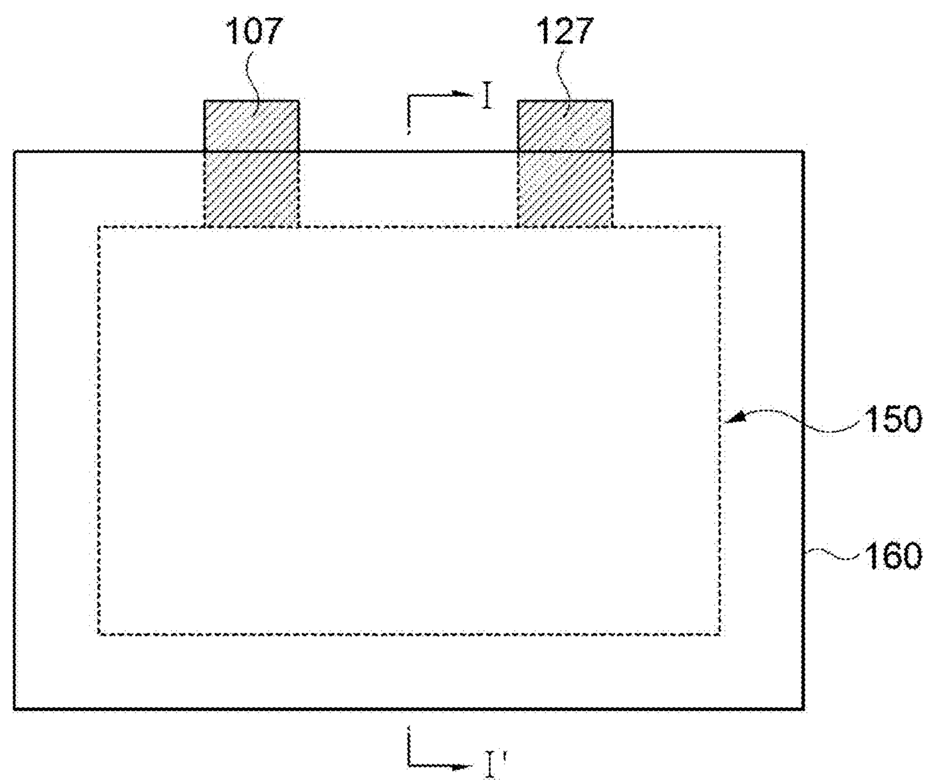
FIGS. 7 and 8 are a schematic plan view and a cross-sectional view, respectively, of a lithium secondary battery in accordance with exemplary embodiments.
Figure 8:
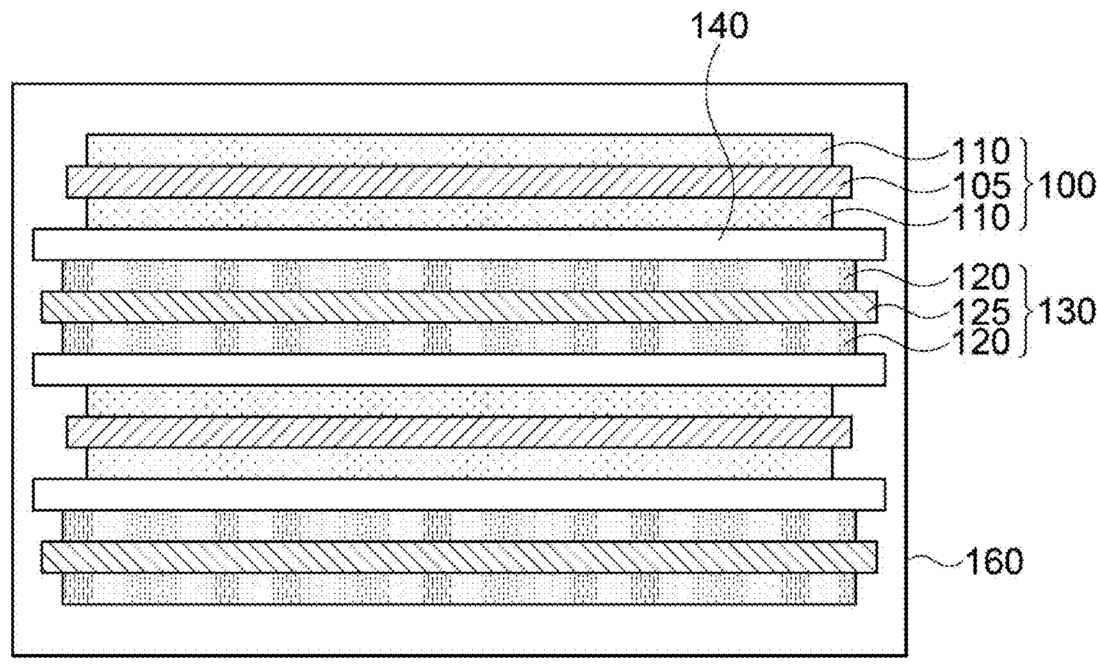

FIGS. 7 and 8 are a schematic plan view and a cross-sectional view, respectively, of a lithium secondary battery in accordance with exemplary embodiments.

Referring to FIGS. 7 and 8, a lithium secondary battery may include a cathode 130, an anode 140 and a separation layer 140.

The cathode 130 may include a cathode current collector 105 and a cathode active material layer 110 formed by coating a cathode active material including the above-described lithium-transition metal composite oxide particle 50 on the cathode current collector 105.

For example, the lithium-transition metal composite oxide particle 50 on which the first coating layer 60 including the La—Zr—O compound is formed may be mixed in a solvent with a binder, a conductive material and/or a dispersive agent to form a slurry. The slurry may be coated on the cathode current collector 105, and then dried and pressed to form the cathode.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on a surface of the anode current collector 125.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, silicon (Si)-based compound, tin, etc., may be used.

The amorphous carbon may include a hard carbon, cokes, a mesocarbon microbead (MCMB) fired at a temperature of 1500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

The anode current collector 125 may include, e.g., gold, stainless steel, nickel, aluminum, titanium, copper or an alloy thereof, preferably may include copper or a copper alloy.

In some embodiments, a slurry may be prepared by mixing and stirring the anode active material with a binder, a conductive material and/or a dispersive agent in a solvent. The slurry may be coated on the anode current collector, and then dried and pressed to form the anode 130.

The binder and the conductive material substantially the same as or similar to those mentioned above may be used in the anode 130. In some embodiments, the binder for forming the anode 130 may include an aqueous binder such as styrene-butadiene rubber (SBR), and carboxymethyl cellulose (CMC) may also be used as a thickener.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding the separation layer 140.

The electrode assembly 150 may be accommodated together with an electrolyte in an outer case 160 to define the lithium secondary battery. In exemplary embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 7, electrode tabs (a cathode tab and an anode tab) may protrude from the cathode current collector 105 and the anode current collector 125 included in each electrode cell to one side of the outer case 160. The electrode tabs may be welded together with the one side of the case 160 to be connected to an electrode lead (a cathode lead 107 and an anode lead 127) that may be extended or exposed to an outside of the outer case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Lithium Precursor and Transition Metal Precursor (S10)

$NiSO_4$, $CoSO_4$ and $MnSO_4$ were mixed in a molar ratio of 0.94:0.05:0.01, respectively using distilled water from which dissolved oxygen was removed by bubbling with $N_2$ for 24 hours. The solution was put into a reactor at 50° C., and NaOH and $NH_4OH$ were used as a precipitating agent and a chelating agent, respectively, to proceed with a co-precipitation reaction for 48 hours to obtain $Ni_{0.94}Co_{0.05}Mn_{0.01}(OH)_2$ as a transition metal precursor. The obtained precursor was dried at 80° C. for 12 hours and then re-dried at 110° C. for 12 hours.

In the above composition (e.g., 94% Ni), an appropriate firing temperature range according to the above-described Equations 2 and 3 is from 781.2° C. to 811.2° C.

(2) Mixing (S20)

Lithium hydroxide, the transition metal precursor, $La(OH)_3$ as a first flux agent and $Zr(OH)_4$ as a second flux agent were mixed in a dry high-speed mixer. $La(OH)_3$ was put such that a lanthanum content became 1,000 ppm based on a total weight of the lithium-transition metal composite oxide particles to be obtained, and $Zr(OH)_4$ was put such that a zirconium content became 1,000 ppm based on the total weight of the lithium-transition metal composite oxide particles to be obtained.

(3) Firing (S30)

Lithium hydroxide, the transition metal precursor, $La(OH)_3$ and $Zr(OH)_4$ mixed as described above were put into a kiln, and a temperature was raised to about 795° C. at a temperature increasing rate of 2° C./min while supplying oxygen at a flow rate of 100 mL/min to maintain an oxygen concentration in the kiln as 95% or more. The raised temperature was maintained for 10 hours. After the firing, a fine pulverization was performed using a jet mill to obtain the lithium-transition metal composite oxide particles.

(4) Formation of a Metal Oxide Coating Layer $Al_2O_3$ having an average particle diameter from 30 nm to 70 nm was added to the obtained lithium-transition metal composite oxide particles in a dry high-speed mixer and uniformly mixed for 5 minutes to prepare a mixture. The added amount of $Al_2O_3$ was 1,000 ppm based on the total weight of the lithium-transition metal composite oxide particles.

The mixture was placed in a kiln, heated to 700° C. at a rate of 2° C./min, and then maintained at 700° C. for 10 hours. An oxygen gas was passed continuously at a flow rate of 10 mL/min while raising and maintaining the temperature.

After the firing, natural cooling was performed to room temperature, followed by pulverization and classification to obtain lithium-transition metal composite oxide particles coated with a metal oxide. Through the above-described coating and heat treatment, cracks on a particle surface caused by a collision between the particles during the jet milling process were reduced.

(5) Washing, Drying and Formation of a Boron-Containing Coating Layer

The metal oxide-coated lithium-transition metal composite oxide particles were mixed with water in a volume ratio of 1:1, stirred for 10 minutes, and then filtered and washed with water. The filtered lithium-transition metal composite oxide particles were dried at 130° C. for 12 hours.

The washed and dried lithium-transition metal composite oxide particles and 1,000 ppm of $H_3BO_3$ based on a total weight of the particles were put into a dry high-speed mixer, and the mixture was uniformly mixed for 5 minutes to prepare a mixture. Specifically, the dried lithium-transition metal composite oxide particles and 1,000 ppm of $H_3BO_3$ based on the total weight of the particles were put into a kiln in an oxygen atmosphere, and the temperature was raised to 300° C. at a rate of 2° C./min while performing a dry mixing. After the temperature was raised, the temperature was maintained for 10 hours to prepare lithium-transition metal composite oxide particles having a boron-containing coating layer formed thereon.

(6) Fabrication of Lithium Secondary Battery

A secondary battery was manufactured using the above-described cathode active material. Specifically, a cathode mixture was prepared by mixing the cathode active material, Denka Black as a conductive material, and PVDF as a binder in a mass ratio of 93:5:2, respectively. The mixture was coated on an aluminum current collector, dried and pressed to prepare the cathode. A target electrode density of the cathode after the pressing was adjusted to 3.6 g/cc~3.7 g/cc.

A lithium metal was used as an anode active material.

The cathode and the anode prepared as described above were stacked by notching in a circular shape having a diameter of Φ14 and Φ16, respectively, and a separator (polyethylene, thickness: 13 μm) notched with Φ19 was interposed between the cathode and the anode to form an electrode cell. The electrode cell was put in a coin cell exterior material having a diameter of 20 mm and a height of 1.6 mm, and an electrolyte was injected to form an assembly. The electrode cell was aged for 12 hours or more so that the electrolyte could be impregnated at an inside of the electrode cell.

As the electrolyte, 1M $LiPF_6$ solution in a mixed solvent of EC/EMC (30/70; volume ratio) was used.

The secondary battery prepared as described above was subjected to a formation charging and discharging (charge condition CC-CV 0.1C 4.3V 0.005C CUT-OFF, discharge condition CC 0.1C 3V CUT-OFF).

Example 2

A cathode active material and a lithium secondary battery were prepared by the same method as that in Example 1, except that a temperature was raised to 782° C. in the firing.

Example 3

A cathode active material and a lithium secondary battery were prepared by the same method as that in Example 1, except that a temperature was raised to 810° C. in the firing.

Example 4

A cathode active material and a lithium secondary battery were prepared by the same method as that in Example 1, except that $(NH_4)H_2PO_4$ was additionally added such that a phosphorous (P) content became 1,000 ppm based on the total weight of the lithium-transition metal composite oxide particles to be obtained when coating the metal oxide.

Example 5

A cathode active material and a lithium secondary battery were obtained by the same method as that in Example 1, except that a temperature was raised to 775° C. in the firing.

Example 6

A cathode active material and a lithium secondary battery were prepared by the same method as that in Example 1, except that a temperature was raised to 830° C. in the firing.

Example 7

A cathode active material and a lithium secondary battery were prepared by the same method as that in Example 1, except that $La(OH)_3$ was added so that the lanthanum content became 450 ppm based on the total weight of the lithium-transition metal composite oxide particles to be obtained.

Example 8

A cathode active material and a lithium secondary battery were prepared by the same method as that in Example 1, except that $La(OH)_3$ was added so that the lanthanum content became 2,050 ppm based on the total weight of the lithium-transition metal composite oxide particles to be obtained.

Comparative Example 1

A cathode active material and a lithium secondary battery were prepared by the same method as that in Example 1, except that the first and second flux agents were not added, and a temperature was raised to 845° C. in the firing.

Comparative Example 2

A cathode active material and a lithium secondary battery were prepared by the same method as that in Comparative Example 1, except that a temperature was raised to 795° C. in the firing.

For the cathode active materials prepared according to the above-described Examples and Comparative Examples, crystallite sizes were calculated using an XRD analysis and Equation 1 as described above.

Specific XRD analysis equipment and conditions are shown in Table 1 below.

TABLE 1

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

Further, Ni molar ratios among transition metals, input of flux agent, BET specific surface areas, firing temperatures and lanthanum input amounts are shown in Table 2 below.

TABLE 2

| No. | Ni ratio (%) | Input of Flux Agent | Coating Metal | Firing Temperature (° C.) | La amount (ppm) | BET specific surface area ($m^2/g$) | crystallite size (nm) | D50 (μm) |
|---|---|---|---|---|---|---|---|---|
| Example 1 | 94 | O | Al | 795 | 1,000 | 0.63 | 428 | 2.65 |
| Example 2 | 94 | O | Al | 782 | 1,000 | 0.68 | 330 | 2.29 |
| Example 3 | 94 | O | Al | 810 | 1,000 | 0.55 | 571 | 2.29 |
| Example 4 | 94 | O | Al + P | 795 | 1,000 | 0.61 | 440 | 2.70 |
| Example 5 | 94 | O | Al | 775 | 1,000 | — | 285 | 3.11 |

TABLE 2-continued

| No. | Ni ratio (%) | Input of Flux Agent | Coating Metal | Firing Temperature (° C.) | La amount (ppm) | BET specific surface area ($m^2$/g) | crystallite size (nm) | D50 (μm) |
|---|---|---|---|---|---|---|---|---|
| Example 6 | 94 | O | Al | 830 | 1,000 | — | 650 | 3.05 |
| Example 7 | 94 | O | Al | 795 | 450 | — | 285 | 3.10 |
| Example 8 | 94 | O | Al | 795 | 2,050 | — | 456 | 3.21 |
| Comparative Example 1 | 94 | X | Al | 845 | — | 0.48 | 738 | 3.8 |
| Comparative Example 2 | 94 | X | Al | 795 | — | 0.72 | 200 | 3.5 |

Referring to Table 2, in Examples 1 to 4 where the firing temperatures satisfied Equations 2 and 3 and the lanthanum input amounts were from 500 ppm to 2,000 ppm, the crystallite sizes were from 300 nm to 600 nm and the average particle diameters (D50) were 3.0 μm or less.

In Example 5 where the firing temperature was less than the temperature range according to Equations 2 and 3, a degree of the densification (S34) was relatively small due to the relatively low temperature and the crystallite size was relatively small compared to those of Examples 1 to 4.

In Example 6 where the firing temperature exceeded the temperature range according to Equations 2 and 3, the crystallite size and average particle size were relatively higher than those of Examples 1 to 4 due to a particle agglomeration by an excessive firing.

In Example 7 where the amount of lanthanum input was less than 500 ppm, the flux agent did not sufficiently react with the lithium precursor, and a single particle formation was relatively insufficient. Accordingly, a relatively small crystallite size was obtained compared to those from Examples 1 to 4.

In Example 8 where the amount of lanthanum input exceeded 2,000 ppm, the flux agent reacted non-uniformly with the transition metal precursors, and relatively large crystallite size and average particle size were achieved compared to those from Examples 1 to 4.

In Comparative Examples 1 and 2 where the flux agent was not added, the substantial single particle shape was not formed to cause excessively high or low crystallite sizes and particle sizes.

Figure 9:
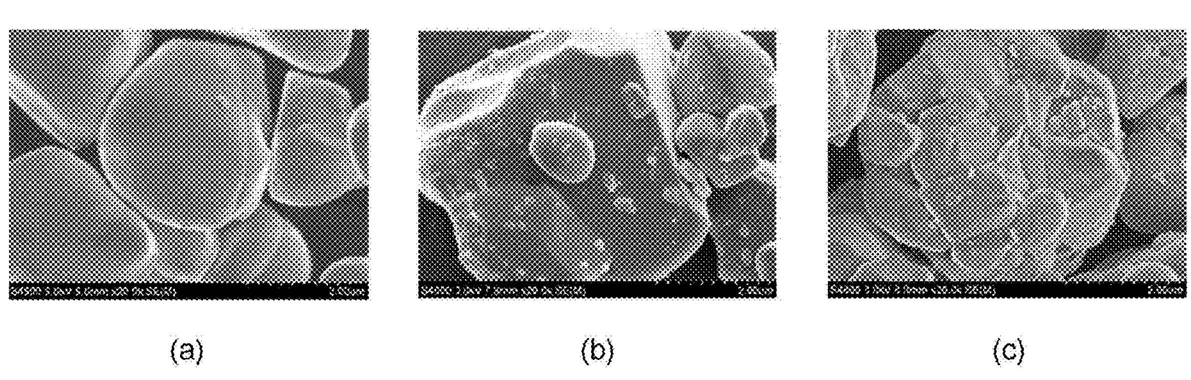
FIG. 9 is SEM images of surfaces of cathode active materials according to Example 1, Comparative Example 1 and Comparative Example 2.

FIG. 9 are SEM images of surfaces of cathode active materials according to Example 1, Comparative Example 1 and Comparative Example 2. Specifically, (a), (b) and (c) of FIG. 9 are SEM images of the surfaces of the cathode active materials of Example 1, Comparative Example 1 and Comparative Example 2, respectively.

Referring to FIG. 9, in Example 1 where the flux agent was added, a cathode active material having a single particle shape was formed. However, in Comparative Example 1 where the flux agent was not added, and the firing temperature exceeded the temperature range according to Equations 2 and 3, the particle size of single particles was highly non-uniform. In Comparative Example 2 where the flux agent was not added, and the firing temperature was within the temperature range according to Equations 2 and 3, the cathode active material of a secondary particle shape having a polycrystalline structure was formed.

Experimental Example

(1) Measurement of Cation Mixing Ratio

A cation mixing may refer to, e.g., a phenomenon that Ni ions are located in a Li layer in a layered structure of the lithium-transition metal composite oxide particle. If a cation mixing ratio is high, a discharge capacity may be decreased.

The cation mixing ratio of the cathode active materials according to the above-described Examples and Comparative Examples were measured by a Rietveld Method.

Specifically, a XRD peak was measured, and the lattice constant was refined through a least square method or a Rawlay method. Thereafter, an XRD simulation was performed on a structural model constructed by estimating an arrangement of each atom based on a crystallographic aspect and a chemical composition. A ratio of Ni ions occupying a Li site (site 3a) of the cathode active material was calculated through the above simulation.

(2) Evaluation on Initial Charge/Discharge Capacity and Initial Capacity Efficiency Evaluation After charging (CC-CV 0.1 C 4.3V 0.005C CUT-OFF) the lithium secondary batteries prepared according to Examples and Comparative Examples in a chamber at 25° C., a capacity (initial charge capacity) of each battery was measured. Thereafter, the battery was discharged (CC 0.1C 3.0V CUT-OFF), and a capacity (initial discharge capacity) was measured.

An initial capacity efficiency was evaluated as a percentage (%) by dividing the measured initial discharge capacity with the measured initial charge capacity.

(3) Evaluation on of Capacity Retention (Life-Span Property) During Repeated Charging and Discharging Charging (CC/CV 0.5C 4.3V 0.05C CUT-OFF) and discharging (CC 1.0C 3.0V CUT-OFF) were repeated with 50 cycles for lithium secondary batteries according to Examples and Comparative Examples. A capacity retention was evaluated as a percentage by dividing a discharge capacity at the 50th cycle with the discharge capacity at the 1st cycle.

The evaluation results are shown in Table 3 below.

TABLE 3

| No. | Cation Mixing Ratio (%) | Initial Charge Capacity (mAh/g) | Initial Discharge Capacity (mAh/g) | Initial Charge Efficiency (%) | Capacity Retention (%) |
|---|---|---|---|---|---|
| Example 1 | 0.94 | 252.0 | 216.9 | 86.1 | 90.4 |
| Example 2 | 1.27 | 252.1 | 220.3 | 87.4 | 91.7 |
| Example 3 | 2.3 | 247.9 | 215.9 | 87.1 | 93.0 |
| Example 4 | 0.82 | 252.6 | 218.6 | 86.6 | 93.9 |
| Example 5 | 1.25 | 251.8 | 216.1 | 85.8 | 90.5 |
| Example 6 | 2.45 | 249.0 | 213.6 | 85.7 | 89.0 |

TABLE 3-continued

| No. | Cation Mixing Ratio (%) | Initial Charge Capacity (mAh/g) | Initial Discharge Capacity (mAh/g) | Initial Charge Efficiency (%) | Capacity Retention (%) |
|---|---|---|---|---|---|
| Example 7 | 1.68 | 247.8 | 213.9 | 86.3 | 89.1 |
| Example 8 | 1.72 | 247.5 | 213.4 | 86.2 | 90.2 |
| Comparative Example 1 | 5.1 | 244.4 | 205.8 | 84.2 | 85.4 |
| Comparative Example 2 | 3.5 | 245.0 | 209.3 | 85.4 | 87.2 |

Referring to Table 3, in Examples where the single particle and the first coating layer were formed by introducing the flux agent, the reduced cation mixing ratios, improved life-span properties and increased initial capacity efficiencies were generally provided when compared to those from Comparative Examples.

Figure 10:
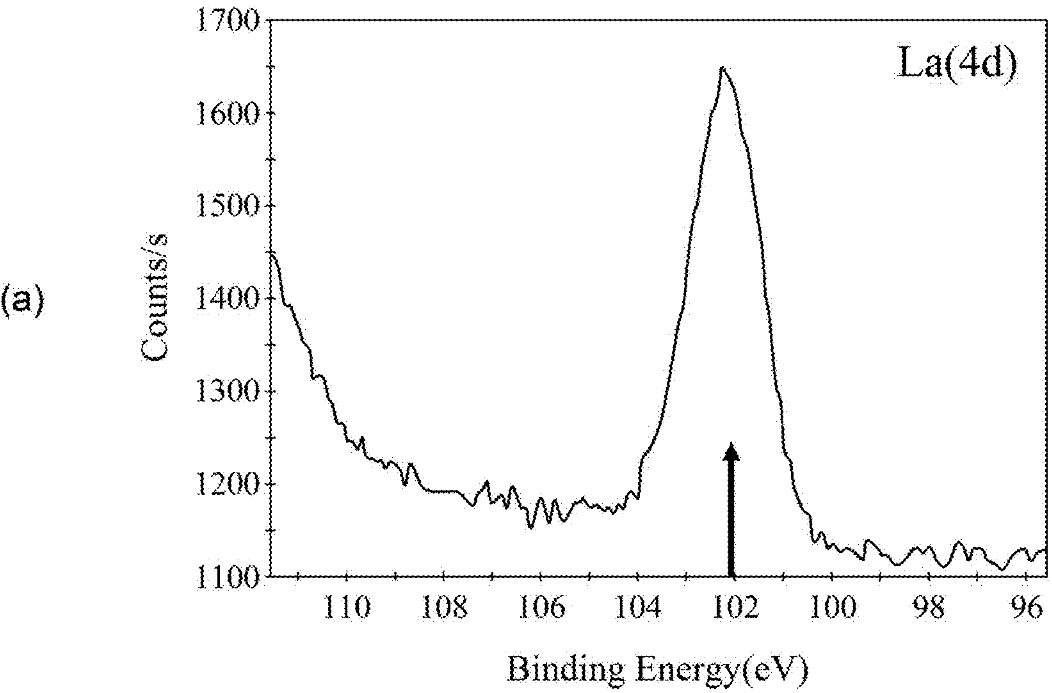
FIG. 10 is a graph obtained by measuring element signals on a surface of a cathode active material of Example 1 through an XPS (X-ray Photoelectron Spectroscopy) analysis.
Figure 10:
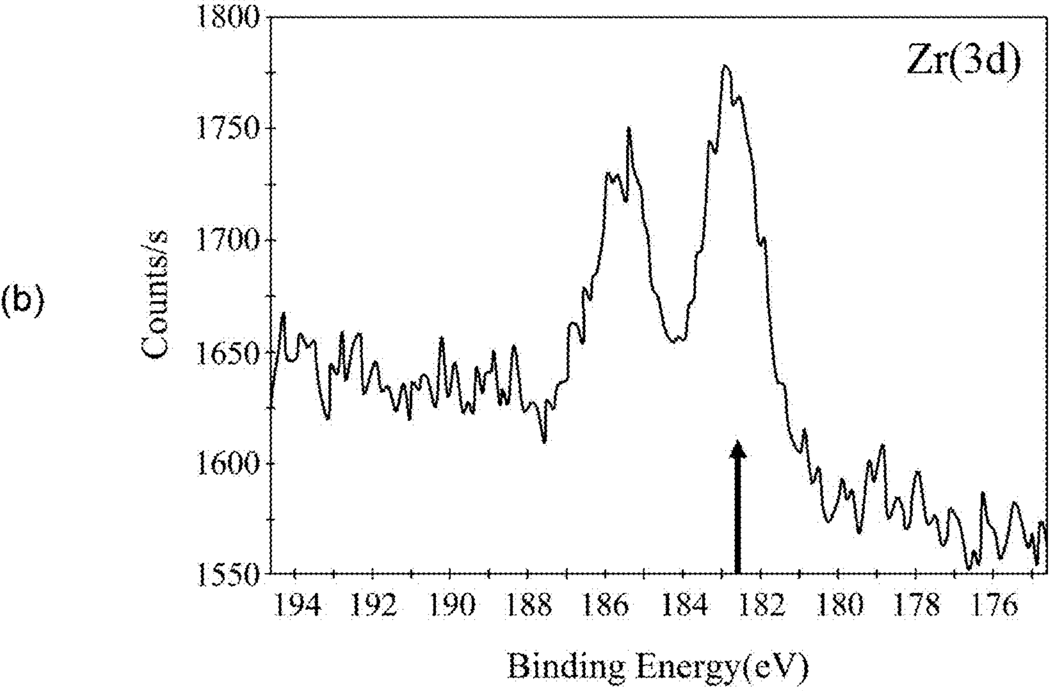

FIG. 10 is a graph obtained by measuring element signals on a surface of a cathode active material of Example 1 through an XPS (X-ray Photoelectron Spectroscopy) analysis. Specifically, FIG. 10 is a graph of measuring La and Zr components of the La—Zr—O compound present on the surface of the lithium-transition metal composite oxide particle of Example 1.

The XPS analysis was performed under the following conditions.

1) X-ray type: Source—Al Ka, Beam size 50 um
2) Analyzer: CAE Mode
3) Number of scans: 2 (survey scan), 10-50 (Narrow Scan)
4) Pass energy: 150 eV (survey scan), 20 eV (Narrow Scan)

Referring to FIG. 10, in Example 1, the La—Zr—O compound was formed on the surface of the lithium-transition metal composite oxide particle by adding the first and second flux agents. Thus, a La (4d) peak at 102 eV was clearly observed and a Zr (3d) peak at 128.8 eV was clearly observed in the XPS analysis.

In Example 5 where the firing temperature was less than the temperature range according to Equations 2 and 3, a degree of the densification (S34) was relatively small, and the capacity retention was relatively degraded compared to those from Examples 1 to 4.

In Example 6 where the firing temperature exceeded the temperature range according to Equations 2 and 3, the capacity retention was relatively degraded compared to those from Examples 1 to 4 by the particle agglomeration due to the excessive firing.

In Example 7 where the lanthanum input amount was less than 500 ppm, the flux agent did not sufficiently react with the lithium precursor, and the single particle formation was relatively insufficient. Accordingly, relatively low capacity and output properties were provided compared to those from Examples 1 to 4.

In Example 8 where the lanthanum input amount was more than 2,000 ppm, the flux agent reacted non-uniformly with a large amount of the transition metal precursors, and the relatively low-capacity efficiency was provided measured compared to those from Examples 1 to 4.

In Comparative Example 1 where the firing temperature was beyond the temperature range according to Equations 2 and 3 and the flux agent was not used, the single particles were formed due to the high-temperature firing, but the average particle diameter was excessively increased to result in degraded capacity properties compared to those from Examples.

In Comparative Example 2 where the firing temperature was within the temperature range according to Equations 2 and 3, but the flux agent was not used, the single particle was not substantially formed, resulting in degraded capacity retention during the repeated charging and discharging. Further, lower capacity properties than those of Examples were provided.

Figure 11:
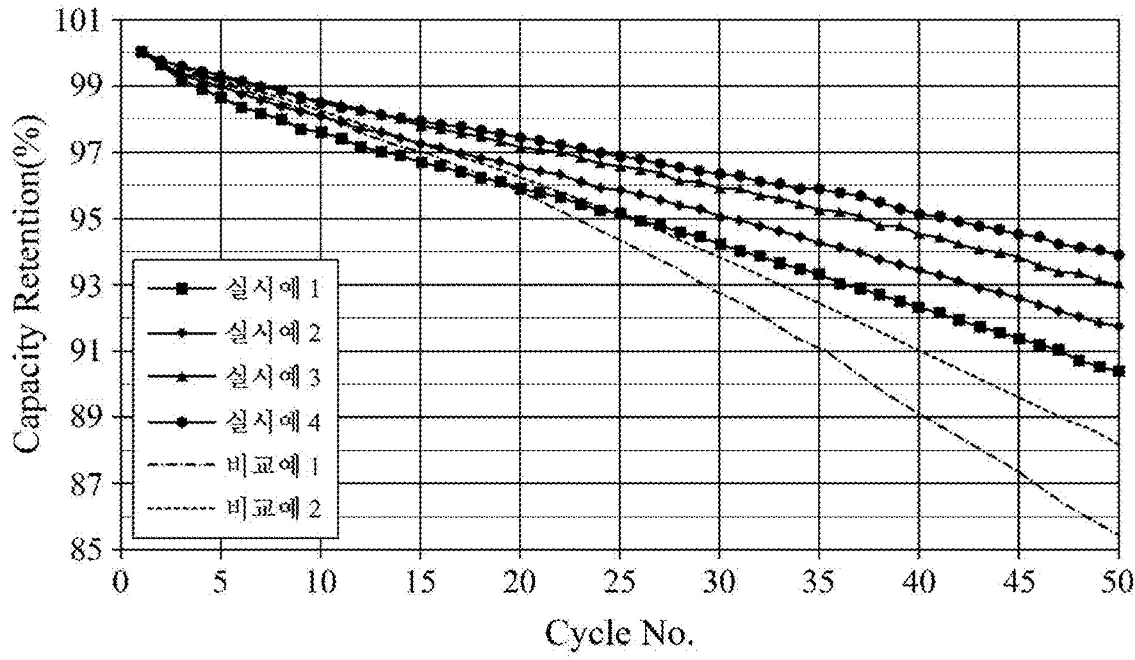
FIG. 11 is a graph showing a capacity change while repeating charge and discharge of secondary batteries according to Examples and Comparative Examples.

FIG. 11 is a graph showing a capacity change while repeating charge and discharge of secondary batteries according to Examples and Comparative Examples. Specifically, FIG. 11 is a graph showing the capacity retentions of Examples 1 to 4 and Comparative Examples 1 and 2 for the cathode active material having a composition of Ni 94%.

Referring to FIG. 11, in Examples where the single particle and the first coating layer were formed by introducing the flux agent, enhanced capacity retentions were achieved compared to those from Comparative Examples where the flux agent was not added.

In Example 4 where phosphorus was contained in the coating layer by additionally adding $(NH_4)H_2PO_4$ during the formation of the metal oxide coating layer, particle surface cracks caused by the collision between particles during the jet milling process in the above-described firing (S30) process were protected to further enhance the life-span property compared to that from Example 1.

What is claimed is:

1. A cathode active material for a lithium secondary battery, comprising:

a lithium-transition metal composite oxide particle consisting of a structure in which a plurality of primary lithium-transition metal composite oxide particles are integrally merged together and are thermally converted into a single lithium-transition metal composite oxide particle without pores;

a first coating layer formed on a surface of the lithium-transition metal composite oxide particle, the first coating layer comprising a La—Zr—O compound; and a second coating layer formed on a surface of the first coating layer, the second coating layer comprising a Li—B—O compound, wherein an average particle diameter, D50, of the lithium-transition metal composite oxide particle is 2.0 μm or more, and wherein the average particle diameter, D50, is the particle diameter at 50% cumulative volume in the particle size distribution.

2. The cathode active material for a lithium secondary battery of claim 1, wherein the La—Zr—O compound is derived from a first flux agent containing lanthanum and a second flux agent containing zirconium.

3. The cathode active material for a lithium secondary battery of claim 2, wherein the first flux agent comprises $La(OH)_3$ and the second flux agent comprises $Zr(OH)_4$.

4. The cathode active material for a lithium secondary battery of claim 1, wherein a crystallite size of the lithium-transition metal composite oxide particle measured by an XRD analysis is in a range from 300 nm to 600 nm, and the crystallite size is calculated by Equation 1:

$$L = \frac{0.9\lambda}{\beta\cos\theta} \quad \text{[Equation 1]}$$

wherein, in Equation 1, L is the crystallite size (nm), λ is an X-ray wavelength (nm), β is a full width at half maximum of a (003) plane (rad), and θ is a diffraction angle (rad).

5. The cathode active material for a lithium secondary battery of claim 1, wherein an average particle diameter, D50, of the lithium-transition metal composite oxide particle is less than 3.0 μm, wherein the average particle diameter, D50, is a particle diameter at 50% cumulative volume in a particle size distribution.

6. The cathode active material for a lithium secondary battery of claim 1, wherein the La—Zr—O compound is doped or coated with a doping or coating element, and the doping or coating element is at least one of Mg, Ca, Al, Ti, W, Ta, P and Nb.

7. The cathode active material for a lithium secondary battery of claim 1, wherein the cathode active material includes a monolithic shape in which 2 to 10 of the lithium-transition metal composite oxide particles are attached or adjacent to each other.

8. The cathode active material for a lithium secondary battery of claim 1, wherein a La peak is observed at 102 eV and a Zr peak is observed at 128.8 eV when the surface of the lithium-transition metal composite oxide particle is measured by an X-ray photoelectron spectrometer (XPS) analysis.

9. The cathode active material for a lithium secondary battery of claim 1, wherein the La—Zr—O compound does not comprise $Li_7La_3Zr_2O_{12}$ having a garnet structure.

10. A lithium secondary battery comprising:

a cathode comprising a cathode active material layer that comprises the cathode active material for a lithium secondary battery of claim 1; and an anode facing the cathode.

* * * * *